United States Patent Office 2,920,647
Patented Jan. 12, 1960

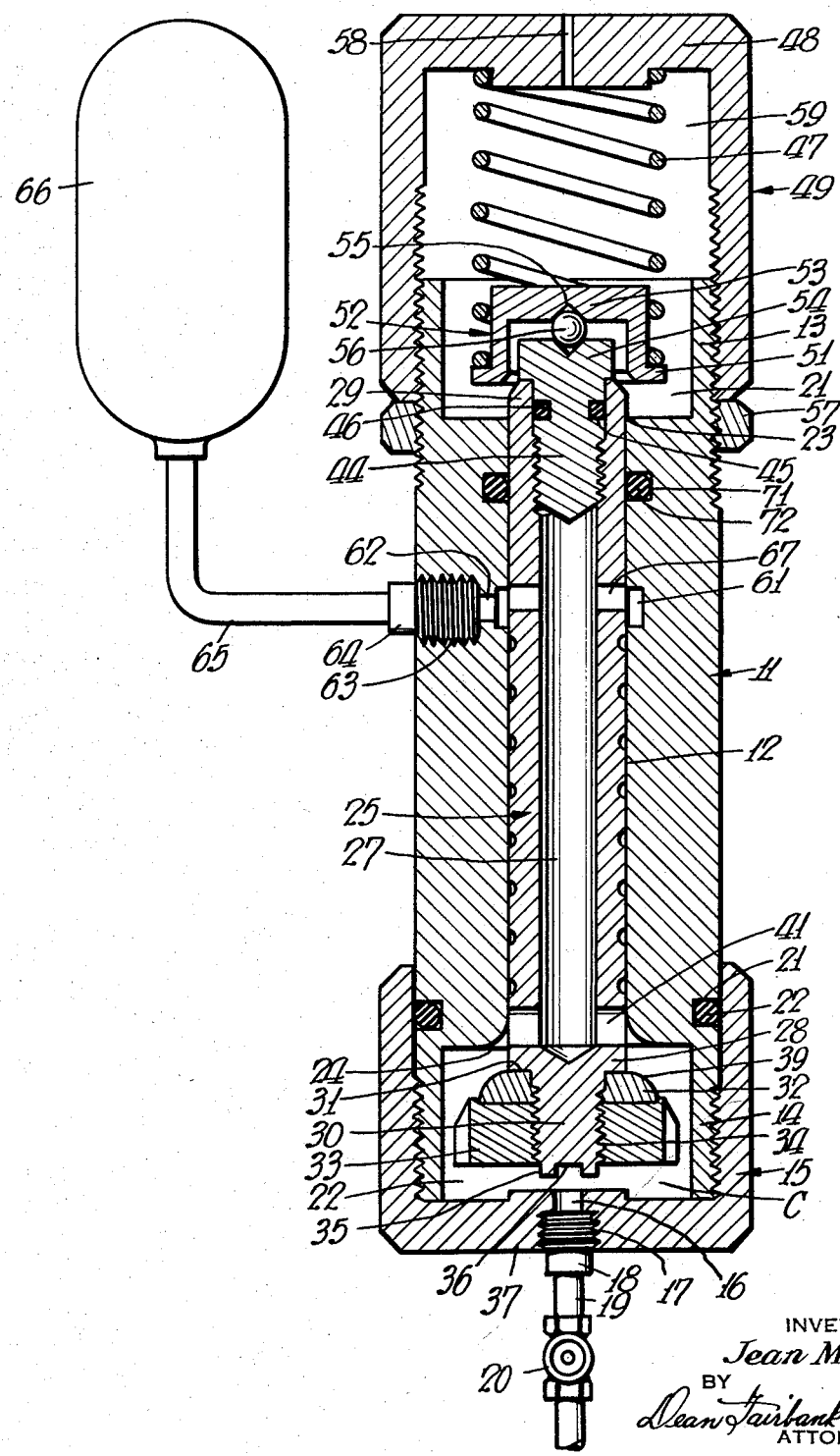

2,920,647

PRESSURE REDUCER

Jean Mercier, New York, N.Y.

Application July 1, 1954, Serial No. 440,615

Claims priority, application France July 25, 1953

8 Claims. (Cl. 137—505.18)

This invention relates to the art of pressure reducers, more particularly of the type to provide a constant flow of fluid at a predetermined pressure.

Where pressure reducers utilize a sliding piston to control the pressure of a fluid and a resilient seal associated with the piston to prevent leakage, is subjected to a high pressure when the piston is moving, in addition to the high friction induced by the seal causing it to wear rapidly and break down, with resultant malfunctioning of the pressure reducer, as the wear on the seal will progressively increase, the device cannot be set to maintain a predetermined pressure without constant adjustment.

It is accordingly among the objects of the invention to provide a pressure reducer that is compact, relatively light in weight, having but few parts which may readily be fabricated and assembled at low cost, which will operate for long periods without becoming out of order, and which when once set to a desired pressure will dependably maintain such pressure on the fluid flowing therethrough without further adjustments.

According to the invention, the pressure reducer comprises a casing in which a hollow piston is slidably mounted, the casing having a pressure port which will communicate with a bore leading into the interior of the piston when the pressure port and the piston bore are in alignment. A resilient seal encompasses the piston to prevent leakage between the adjacent wall surfaces of the casing and the piston. The opposed sides of the seal, when no fluid is flowing through the pressure reducer, is subjected to a high differential pressure, and when fluid is flowing through the outlet of the pressure reducer, to a relatively low differential pressure.

The piston carries a sealing member which, when the pressure port is connected to a source of fluid under pressure and the outlet of the pressure reducer is closed, will move against its seat to cut off communication between the hollow piston and a chamber between the sealing member and the outlet. As a result, the pressure in the hollow piston will rise to provide the high differential pressure on opposed sides of the piston seal. When the outlet of the pressure reducer is opened, the sealing member will move off its seat so that the interior of the piston will communicate with said chamber and as fluid flows from the outlet, the differential pressure on the piston seal will be reduced to a relatively low amount.

In the accompanying drawings in which is shown one of various possible embodiments of the several features of the invention, the single figure is a longitudinal sectional view of the device.

Referring now to the drawings, the device desirably comprises a cylindrical casing 11 having a longitudinal bore 12 extending therethrough and having an enlarged cavity 21, 22 at each of its ends 13 and 14. Affixed to the end 14 of the casing 11 is a cap 15 which has an axial bore 16 longitudinally aligned with bore 12 of the casing and of enlarged diameter at its outer end as at 17, defining an outlet port, to receive a coupling 18 connected by line 19 through valve 20 to an air starter, for example.

Although the cap 15 may be affixed to end 14 in any suitable manner, it desirably is screwed thereon and the casing 11 has an annular groove 21 in which a resilient seal 22' is positioned to prevent leakage between the casing 11 and cap 15.

Slidably mounted in the bore 12 of casing 11 and extending beyond both ends 23, 24 thereof, is an elongated piston 25, desirably a rod having a longitudinal bore 27 extending from near one end 28 through the other end 29. The end 28 of piston 25 is of reduced diameter as at 30, defining a shoulder 31 and a sealing member 32, desirably a ring of resilient material encompasses reduced end 30 and is retained against shoulder 31 by a nut 33 screwed on the correspondingly threaded portion 34 of reduced end 30. The end 30 extends beyond nut 33 as at 35, and has a slot 36 thereacross so that when said end 35 abuts against the wall 37 of cap 15 over bore 16 therethrough, communication will still be provided to said bore 16.

The sealing member 32 desirably has a rounded surface 39 and is designed to seat against the correspondingly rounded portion of end 24 of bore 12 to effect a seal in the manner hereinafter described.

The piston 25 has a transverse passageway 41 therethrough, so positioned adjacent end 28 thereof that when the end 35 is seated on floor 37, the passageway 41 will provide communication between piston bore 27 and the chamber C defined between end 14 of cylinder 11 and cavity 22.

Screwed into the end 29 of the piston 25 is a plug 44 which desirably has an annular groove 45 in which a resilient seal 46 is positioned to prevent leakage between the piston 25 and the plug 44.

The piston 25 is normally urged to position in which end 35 seats against floor 37 by means of a coil spring 47 compressed between the end 48 of a cap 49 and the flange 51 of a cup shaped follower 52. As shown, the opposed surfaces of the wall 53 of follower 52 and the head 54 of plug 44 have recesses 55 in which a ball 56 is positioned to prevent binding of piston 25 in bore 12.

The cap 49 is suitably mounted on the end 13 of casing 11 so that the tension of spring 47 may be adjusted. To this end, the cap is screwed on the correspondingly threaded end 13 and is retained in desired position of adjustment by means of a lock nut 57. Desirably the end 48 of the cap 48 is vented as at 58, so that the chamber 59 defined by cap 49 will be under atmospheric pressure.

The bore 12 of casing 11 has an annular groove 61 which is connected by transverse passageway 62 to pressure port 63, the latter desirably being internally threaded to receive a suitable fitting 64 which may be connected by line 65 to a source of fluid under pressure such as an air bottle 66. The piston 25 has a plurality of transverse bores 67 therethrough which, when end 35 is seated against floor 37, will be aligned with annular groove 61 in bore 12.

The bore 12 adjacent its end 23, on one side of bore 62, has an annular groove 71 in which a resilient seal ring 72 is positioned to prevent leakage between the adjacent surfaces of bore 12 and piston 25.

Operation

Under normal conditions, with ports 17 and 63 open, the spring 47 will urge piston 25 downwardly from the position shown, until its lower end 35 seats against floor 37 with slot 36 over bore 16. At this time, annular groove 61 is fully aligned with bores 67 in piston 25, and the passageway 41 is fully open to provide communication between bore 12 in casing 11 and the chamber C.

Assuming that the outlet port 17 is connected through closed valve 20 and line 19 to an air starter, and the port 63 is connected to the source of fluid under pressure such as the compressed air bottle 66 which is charged to say 200 atmospheres, and it is desired to feed the fluid under a pressure of approximately 30 atmospheres to the air starter, the tension of coil spring 47 is adjusted to this amount by rotating cap 49.

The air under pressure will pass through line 65, port 63, bore 62, annular groove 61, aligned bores 67 into bore 27 of the piston 25, and thence through passageway 41 into chamber C. As valve 20 is normally closed when the starter is not actuated, the pressure in chamber C will rapidly build up. When such pressure reaches say 31 atmospheres, as the surface area of the undersurface of nut 33 and the end 35 of the piston 23 is greater than that of the rounded surface 39 of sealing member 32, the force exerted by spring 47 will be partially overcome and the piston 25 will rise.

The piston will not rise sufficiently to seat sealing member 32 at such pressure of 31 atmospheres, due to the friction exerted by seal ring 72 against the piston 25, plus the force of spring 47. However, port 63 will be completely throttled or closed by such movement of the piston 25.

At this time the pressure in bore 27 and against one side of resilient seal ring 72, due to leakage between the piston and the bore 12, is only 31 atmospheres and, due to vent 58, the pressure on the other side of seal ring 72 is atmospheric. As passageway 41 is still open, due to continued leakage through port 63 and bores 67, the pressure in chamber C will rise and when it reaches say 33 atmospheres, as the friction caused by seal ring 72 and the force of spring 47 is overcome, sealing member 32 will seat against the end 24 of bore 12 to close passageway 41.

Due to continued leakage through port 63 and bores 67, the pressure in bore 27 of piston 25 will gradually rise to 200 atmospheres. However, as such pressure will be exerted against both ends of the piston, it will have no effect on the latter.

At this time the pressure on one side of seal 72 will be 200 atmospheres and on the other, due to vent 58, one atmosphere. Thus there will be a dependable fluid seal and as the piston 25 is not moving, no injury will be imparted to such seal 72.

To operate the air starter, the valve 20 is opened. As fluid from chamber C will flow through line 19, the pressure in chamber C will immediately drop from 33 atmospheres. As there is only a relatively small amount of fluid in chamber C, it is normally not sufficient to operate the starter. When the pressure in chamber C reaches say 29 atmospheres, the spring 47 will overcome the friction of seal ring 72 and move the piston 25 downward slightly to crack the seal 24, 32. As a result, the pressure in bore 27 and against the inner side of seal ring 72 will immediately drop to 29 atmospheres, i.e., the pressure in chamber C. Thus as the seal ring 72 is now only under relatively slight pressure, subsequent sliding movement of the piston 25 will not be impeded, and no injury will be caused to seal 72. As the friction exerted by the seal ring 72 is thus materially reduced, the spring 27 will move the piston further, so that sealing member 32 will move further from its seat 24, and bores 67 will be moved more into alignment with port 63 so that the pressure in bore 27 and chamber C will again rise. When such pressure rises to say 31 atmospheres, as the seal ring exerts little friction due to the relatively low pressure of 31 atmospheres on one side, the force exerted by spring 27 will be overcome and piston 25 again will rise until the pressure port 63 is throttled by the movement of bores 67 out of alignment therewith, until the pressure in bore 27 and chamber C again falls to 29 atmospheres and the cycle is repeated.

As the seal 72 is only subjected to substantially the full pressure in the air bottle 66 when valve 20 is closed and the piston 25 is not moving, no injury will be caused thereto. When the valve 20 is opened, the pressure on the seal ring 72 will fall to from 29 to 31 atmospheres, so that it will exert little friction against the sliding piston 25, with the result that the seal ring 72 will be long lasting and in addition, by reason of the relatively low friction caused thereby, the accuracy of the device in regulating the pressure within the desired limits will not be impaired. As the sealing member 32 will be spaced from its seat 24 during normal operation of the device, it will not be subjected to wear and will not impede the flow of fluid to the air starter.

Although the device has been illustratively described as controlling the pressure of a fluid such as air, it could also be used to control the pressure of a liquid such as oil.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure reducer of the character described comprising a casing having a bore, a hollow piston slidably mounted in said casing bore, said casing having a pressure port leading into the casing bore, said piston having an inlet between its ends leading into the interior thereof, resilient means associated with the piston and normally retaining the pressure port in communication with the piston inlet, a chamber having an outlet formed at one end of said casing bore, the interior of said piston normally being in communication with said chamber, a sealing member in said chamber carried by said piston at one end and normally spaced from the adjacent end of said casing bore, said pressure port and said inlet and said sealing member and the adjacent end of the casing bore being arranged for movement of said inlet out of communication with said pressure port before movement of said sealing member against the adjacent end of the casing bore, a resilient O-ring seal encompassing said piston positioned between the pressure port and the other end of the piston to provide a seal between the adjacent surfaces of the piston and the casing bore, and means to provide a differential between the pressures on opposed sides of said seal.

2. The combination set forth in claim 1, in which the bore of the casing has an annular groove and the resilient seal is positioned in said groove.

3. The combination recited in claim 1 in which said piston is a rod having a longitudinal bore therein, said piston inlet is a transverse bore extending through the piston into the bore thereof and communication is provided between the piston bore and said chamber by means of a passageway through said piston adjacent the end thereof carrying said sealing member.

4. The combination set forth in claim 1 in which a cap is screwed on the end of the casing remote from the chamber and the resilient means comprises a coil spring reacting at its ends against the end wall of said cap and said piston.

5. The combination set forth in claim 1 in which the means to provide a differential between the pressure on opposed sides of the resilient seat comprises a vent in said casing providing communication between the atmosphere and the side of said resilient seal opposed to the side thereof adjacent the pressure port.

6. A device of the character described comprising a casing having a bore therein, said bore being of enlarged diameter at one end defining a chamber having an outlet and having a vent to atmosphere at its other end, a piston slidably mounted in said bore and extending at one end beyond one end of said bore into said chamber, said piston having a longitudinal bore therein, a sealing member affixed to the extending end of said piston and adapted to seat against the adjacent end of said casing bore to seal the latter, said piston having a transverse passageway adjacent said sealing member leading into the piston bore, means normally urging said piston in direction to retain said sealing member spaced from its seat and to retain said transverse passageway in communication with said chamber, a resilient O-ring encompassing said piston, said casing having a passageway leading into the bore thereof between the resilient O-ring and the sealing member on said piston, said piston having an inlet to the bore thereof movable into communication with said passageway, said passageway and said inlet and said sealing member and the adjacent end of the casing bore being arranged for movement of said inlet out of communication with said passageway before movement of said sealing member against the adjacent end of the casing bore.

7. The combination set forth in claim 6 in which a cap is screwed on the end of the casing remote from said chamber, said vent comprises a bore through the end of said cap, said cap defining a chamber into which extends the other end of said piston and the means normally urging said piston in direction to retain said sealing member spaced from its seat comprises a coil spring in the cap chamber reacting against the end of the cap and the adjacent end of the piston.

8. A pressure reducer comprising a casing having an inlet port and an outlet port, valve means for each of said ports and operatively connected successively to control said ports, said valve means being connected for flow of fluid therebetween, resilient means normally retaining said inlet port in communication with said outlet port, said valve means and said ports being arranged for opening of the valve means controlling the outlet port before opening of the valve means controlling said inlet port, the casing having a bore with the inlet port leading thereinto and the valve means controlling said inlet port comprising a piston slidable in said bore and said valve controlling the outlet port being a poppet valve, a resilient seal ring encompassing said piston and being subjected to the inlet pressure only when both the valve means controlling the inlet port and the poppet are closed.

References Cited in the file of this patent

UNITED STATES PATENTS

| | | |
|---|---|---|
| 1,069,188 | Saefke | Aug. 5, 1913 |
| 1,217,726 | Eckenroth | Feb. 27, 1917 |
| 1,458,718 | Lord | June 12, 1923 |
| 2,105,876 | Birch | Jan. 18, 1938 |
| 2,164,669 | Thomas | July 4, 1939 |
| 2,522,913 | Westman | Sept. 19, 1950 |
| 2,524,142 | Seeloff | Oct. 3, 1950 |

FOREIGN PATENTS

| | | |
|---|---|---|
| 18,266 | Great Britain | Sept. 9, 1905 |